United States Patent [19]

Reno

[11] 4,449,215

[45] May 15, 1984

[54] APPARATUS FOR VARYING TRACK SPACING IN MULTI-TRACK OPTICAL RECORD SYSTEMS

[75] Inventor: Charles W. Reno, Cherry Hill, N.J.

[73] Assignee: RCA Corporation, New York, N.Y.

[21] Appl. No.: 361,220

[22] Filed: Mar. 24, 1982

[51] Int. Cl.³ .............................................. G11B 7/00
[52] U.S. Cl. .................................. 369/111; 358/342; 369/112
[58] Field of Search ................... 358/342; 369/44, 51, 369/93, 111, 119, 112

[56] References Cited

U.S. PATENT DOCUMENTS 4,097,895  6/1978  Spong ................................... 358/128
4,209,793  6/1980  Ueno ................................ 369/112 X Primary Examiner—Robert L. Richardson
Attorney, Agent, or Firm—E. M. Whitacre; J. S. Tripoli; J. E. Roehling

[57] ABSTRACT

A Dove prism is provided in a multiple beam optical disc record and playback system. In a multi-track optical system, the multiple spots formed in a multi-channel modulator are imaged on the record medium. The track-to-track spacing between adjacent tracks may be adjusted by rotating the Dove prism such that the angle formed between a line which passes through the center of the spots and the velocity vector of the disc is varied.

14 Claims, 4 Drawing Figures

APPARATUS FOR VARYING TRACK SPACING IN MULTI-TRACK OPTICAL RECORD SYSTEMS

The Government has rights in this invention pursuant to Contract No. F30602-79-C-0271 awarded by the Department of Air Force.

This invention relates generally to apparatus for optically reading and recording high density information, digital or analogue, on the surface of a record medium and, more particularly, to apparatus for optically reading and recording data at extremely high data rates where the use of multiple light beams is desirable.

High density optical disc recording systems which may be used for recording and playing back information are known in the prior art. For example, U.S. Pat. No. 4,097,895 (Spong) describes an optical disc record/playback system wherein data is recorded in the form of pits in an absorptive coating on the surface of an optical disc. In the Spong system, approximately $1 \times 10^{11}$ bits of information can be stored on one side of a disc-shaped record medium having a 30 cm. diameter.

Optical disc data storage systems are also known where the rate at which the information is recorded or played back is increased two, three or more times over a Spong type system by recording and playing back multiple tracks of information simultaneously. In U.S. Pat. application No. 288,550 of C. W. Reno filed on July 30, 1981, a multiple beam optical record and playback apparatus is described. In the Reno apparatus, a single light beam from a radiation source is split into a plurality of read and record beams. Each of the record beams which is focused to a diffraction limited spot is individually modulated by the recording signals. Data is recorded in the form of pits along a plurality of spiral tracks.

In high density multiple track optical systems, it is important to minimize the track-to-track spacing between adjacent tracks or adjacent beams such that the amount of data which may be recorded is maximized. To minimize track spacing, the optics must be precisely aligned. The optics should be arranged to make the beams or the focused beam spots as close together as possible without creating crosstalk problems. Optical alignment can be a time consuming, tedious process. In fact, even after the beams are aligned, instabilities may affect the alignment of the system.

In multiple beam systems it is desirable to maintain a predetermined spacing between adjacent beams. For example, the track spacing can be on the order of the size of the focused spot.

In the Reno system, the track-to-track spacing is adjusted by rotating the beam modulator and beam splitting grating to adjust the landing points of the plural spots. However, rotation of devices which have different axes for the input and exit beams such as the Reno modulator, disturbs the optical alignment of the entire system because the beams on the output side of the modulator move in a radial arc as the modulator is rotated about an axis of the input beams. Thus, as the modulator is rotated the axis of the light beams through the optical system is shifted.

In accordance with the present invention, the track-to-track spacing between adjacent beams in a multiple beam system may be varied without disturbing the optical alignment of the entire system.

In accordance with one aspect of the present invention, a multiple beam optical information recording or retrieval apparatus for use in recording data on or playing back data from a surface of a disc-shaped record medium having a multiple track format is provided. The apparatus includes means for supporting the record medium. A light source provides a plurality of beams of light having beam axes which are substantially aligned in a plane. The plurality of light beams are directed along a given light path and are focused as spots on the surface of the record medium. Relative motion is established between the light beam spots and the surface of the record medium such that one of the spots traces a predetermined path on the surface of the record medium. The plurality of light beams are aligned such that the light spots are incident on the surface of the record medium and the centers of the light spots lie on a straight line. The apparatus further includes means, positioned in the light path, for varying the angle formed between the predetermined path and the straight line through the center of the spots such that, as the angle varies, the track spacing between adjacent tracks in the multiple track format is adjusted.

In accordance with another aspect of the present invention, a multiple beam optical recording and retrieval system having a predetermined track-to-track spacing is provided. The system includes a light source for providing a beam of light. A first beam splitter is positioned to split the beam into record and playback beams defining first and second light paths respectively. A second beam splitter, positioned in the first light path, splits the record beam into a plurality of record beams. Following the record beam splitter the plurality of record beams are directed through a modulator for modulating each of the plurality of record beams. A third beam splitter, positioned in the second light path, splits the playback beam into a plurality of playback beams. The record and playback beams are combined by a combining means such that the combined beams form a third light path which optically couples the combining means and the surface of the record medium. Each of the plurality of light beams is focused to a respective light spot on the surface of the record medium. The plurality of record beams are aligned such that centers of the record light spots lie on a straight line. Relative motion is established between the light spots and the surface such that one of the record light spots traces a predetermined path on the surface of the record medium. The system further includes means for varying the track-to-track spacing. The varying means which is positioned in the first light path adjusts the spot landing to provide the predetermined track-to-track spacing.

In accordance with a further aspect of the present invention, an improved multiple-beam optical record or playback system is described. In the system, the improvement comprises a means for varying the track-to-track spacing between adjacent tracks. In accordance with this aspect of the invention, the track-to-track spacing is varied by rotating the plurality of beams about an axis symmetrical to the plurality of beams and substantially parallel to the beam axis of one of the plurality of beams.

Other features and advantages of the invention will be more fully understood from the following detailed description of the preferred embodiment, the appended claims and the accompanying drawing in which:

Figure 1:
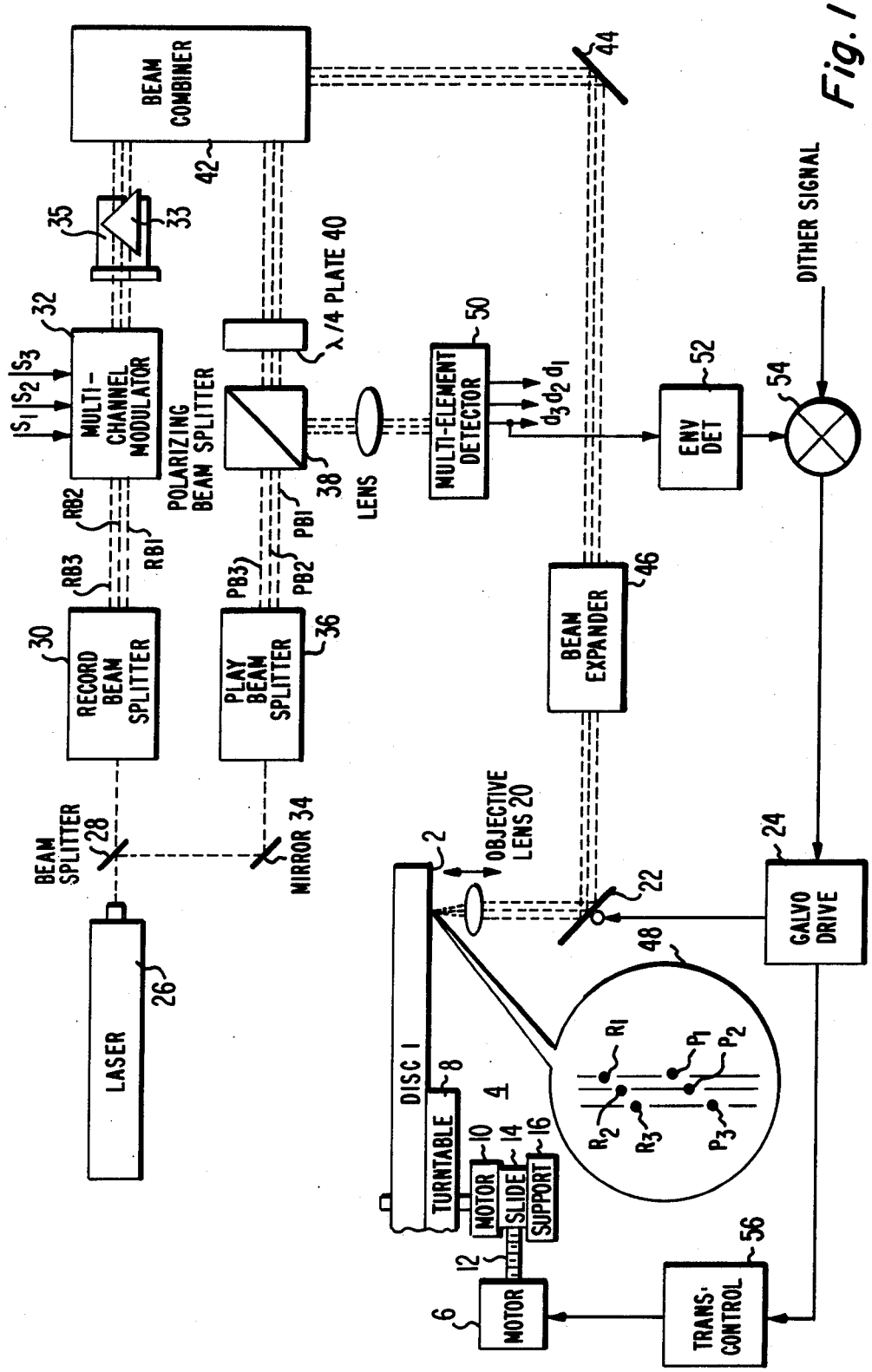
FIG. 1 illustrates a multiple beam optical record and playback apparatus in accordance with the principles of the present invention.

In accordance with the embodiment of FIG. 1, data are recorded in precisely located tracks for rapid retrieval. Recording is achieved on a light sensitive disc onto which data are generally permanently recorded. Data recording is generally effected by ablation or melting. The recorded information is available immediately without further processing. Illustratively, disc 1 is formed having a light sensitive surface 2 upon which ablative recording by the thermal effects of a focused laser beam may be made. For example, a preferred disc for ablative recording may be of a type described in U.S. Pat. No. 4,222,071 issued to A. E. Bell et al.

To provide optical scanning of the surface 2 of disc 1, transport stage 4 is moved linearly by motor 6 at a rate in accordance with the requirements of the desired recording or playback mode while disc 1 is rotated on turntable 8 by motor 10. Transport stage 4 comprises a motor 6 and a feedscrew 12 adapted to be rotated in response to rotations of motor 6. Feedscrew 12 is in mesh engagement with slide 14. When motor 6 is activated so that, for example, feedscrew 12 turns in a clockwise direction, slide 14 will move radially to the right on support 16. Furthermore, if the feedscrew 12 is made to rotate in a counter-clockwise direction, slide 24 will move radially, for example, to the left. Slide 14 may be moved at several different rates of speed during various modes of operation. A motor drive signal moves slide 14 (i.e., coarse tracking movements) such that the light beams focused by objective lens 20 on surface 2 fall within a few tracks of a desired track location. Fine tracking movements, on the other hand, may be achieved by deflecting the light beams to a desired track or location by a galvanometer controlled mirror 22. In this arrangement, the galvanometer causes mirror 22 to move about an axis that is parallel to the surface of the mirror for deflecting the impinging light beams onto surface 2 of disc 1 so that the light spots that are formed by lens 20 may be guided along a selected path on surface 2. Mirror 22 is actuated in response to control signals from galvo drive 24. The galvanometer drive and motor drive signals which are supplied may be of a type described in detail in the aforementioned Reno application.

In operation, the light output of light source 26 (illustratively, an argon type laser emitting a monochromatic light beam of a wavelength of 488 nm) is split by beam splitter 28 into a record beam and a play beam (illustratively, 95% of the light beam from laser 26 passes through splitter 28 in a record beam path and 5% is reflected in a play beam path). The record beam passes through to record beam splitter 30. Beam splitter 30 efficiently divides the single record beam into a plurality of separate, equal amplitude, coplanar beams (illustratively, three beams, RB1, RB2, RB3). Illustratively, beam splitter 30 may comprise a phase grating for splitting the single beam into three or more (e.g., nine) equal amplitude beams. The equal amplitude beams are then passed through multichannel modulator 32 which independently impresses each beam RB1, RB2, RB3 with the information $S_1$, $S_2$, $S_3$ to be recorded. The plurality of beams which are modulated in accordance with the incoming information pass through Dove prism 33 mounted on rotating fixture 35. The operation of Dove prism 33 will be explained in greater detail herein.

The play beam is reflected by mirror 34 to pass through to play beam splitter 36. Beam splitter 36, which may be of a type described in detail in the aforementioned Reno application, efficiently divides the single play beam into a plurality of separate, equal amplitude, coplanar beams (illustratively, three beams, PB1, PB2, PB3). The polarization of low power play beams PB1, PB2, PB3 is set to allow them to pass through polarizing beam splitter 38 on a first pass. The beams from splitter 38 pass through quarter waveplate 40 to beam combiner 42. In beam combiner 42, the modulated record beams are merged with the low power play beams. Beam combiner 42 aligns the record and play beams so that they can be passed through a common optical system to disc surface 2.

The beams from combiner 42 are reflected by mirror 44 to pass through beam expander 46 where they are expanded to provide the magnification necessary to fill objective lens 20 and allow the formation of diffraction limited spots on surface 2 of disc 1.

As shown in inset 48 of FIG. 1, the record beams RB1, RB2, RB3 are focussed on surface 2 as record spots $R_1$, $R_2$, $R_3$ respectively. Record spots $R_1$, $R_2$, $R_3$ are incident on disc 1 such that they form closely spaced (illustratively, 1 μm) parallel information tracks during the recording process. These spots have sufficient power to ablate or melt the absorptive coating on the surface of disc 1 to form pits whose reflectivity is much higher than the normally non-reflective surface. The play beams PB1, PB2, PB3 are focused as spots $P_1$, $P_2$, $P_3$ respectively and are aligned in beam combiner 42 so that they are incident on disc 1 in-line with the recorded information tracks at a point where they allow readout of the data just after recording (illustratively, the play spots are positioned to land approximately 40 μm behind the record spots).

Additionally, play beams PB1, PB2, PB3, are used for tracking purposes. The play beams PB1, PB2, PB3, which are formed by beam splitter 36, are dithered such that light spots $P_1$, $P_2$, $P_3$ exhibit periodic excursions in a radial direction across the surface of disc 1.

Beam splitter 36 may comprise the combination of a phase grating and an acousto-optic modulator. In this arrangement, the phase grating splits the single incoming beam into a plurality of, e.g., three equal amplitude, coplanar beams. The three coplanar beams are incident on the acousto-optic modulator which is used to deflect all three beams. The electrical signal which is used to drive the acousto-optic modulator is frequency modulated such that the beam spots formed from beams PB1, PB2, PB3 exhibit periodic excursions in a direction perpendicular to the track.

Light from the playback spots is reflected by the recorded pits on the disc and passed back through the optical system to the polarizing beam splitter 38. At this point, the light polarization of the playback light beams has been retarded by half a wave (i.e., two passes through quarterwave plate 40) and the light is directed to the multielement detector array 50. The changes in disc reflectivity introduced during recording are converted into electrical signals $d_1$, $d_2$, $d_3$ representative of the recorded information $S_1$, $S_2$, $S_3$ respectively. Playback during record is used to verify that the information recorded has been recorded properly. When errors are detected, the data is rerecorded until no errors are present. In normal playback, the data signals $d_1$, $d_2$, $d_3$ are delivered to suitable processing electronics (not shown) for signal processing.

The operation of the tracking control will now be explained. The playback light beams PB1, PB2, PB3 that impinge as light spots $P_1$, $P_1$, $P_3$ upon previously recorded tracks are dithered periodically in a direction perpendicular to the track path. Illustratively, a fifteen (15) KHz dither signal is used to wobble beams PB1, PB2, PB3. Dithering light beams PB1, PB2, PB3 produce an amplitude modulated signal on detected output signal $d_1$, $d_2$, $d_3$. One or more of these signals may be selected for tracking, e.g., $d_3$. Detector 52 strips the A.M. portion of signal $d_3$. This stripped off signal is coupled to multiplier 54. When the spot $P_3$ is centered on the previously recorded track, the envelope of detector output has an amplitude modulation of twice the dither signal frequency (illustratively, 30 KHz). If the spot $P_3$ is off to one side of the track, the output of detector 52 is at the dither frequency rate and of a particular phase. If the spot $P_3$ is off to the other side of the track, the rate is at the dither frequency but 180° out of phase with the previous case. In multiplier 54 the output from detector 52 is multiplied by the reference signal used to dither the tracking spot. When the spot is centered on the track, no error signal (i.e., dc component) is produced from multiplier 54. In the off track cases the output of multiplier 54 provides an error signal (i.e., dc components) of one polarity when the spot is off center in a first direction and of opposite polarity when the spot is off center in a direction opposite to the first. The amplitude of the error signal is proportional to the amount of mistracking which allows proportional control for tracking purposes. The error signal is fed to galvo drive 24 which moves galvanometer controlled mirror 22 to maintain the spot on track. As the average position of mirror 22 increases to a point just short of where the galvanometer cannot deflect the beam any more, stage 4 is moved to maintain the average position of the galvanometer centered about its deflection range. A galvo position control signal is delivered to translation control 56 which in turn provides a dc signal to motor 6 to move slide 14.

Figure 2:
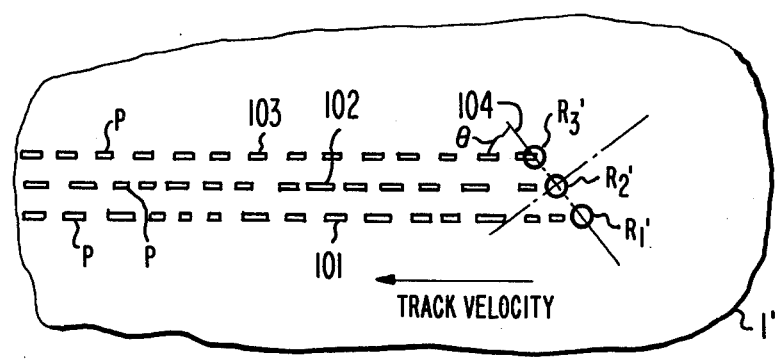
FIG. 2 is a diagram showing the optical spot arrangement in accordance with the present invention.

The operation of the Dove prism 33 will now be discussed with reference to FIGS. 2, 3, and 4 as well as FIG. 1. Dove prisms are commercially available. A conventional Dove prism is formed having two refracting faces and an internally reflecting face. Illustratively, the angle between either refracting face and the reflecting face is normally 45° (see FIG. 4). Often a Dove prism is used in an optical system for rotating an image. In FIG. 2, a portion of a surface of a record medium 1' having recording spots $R_1'$, $R_2'$. $R_3'$ formed thereon is shown. Information tracks 101, 102, 103 comprise a succession of spaced pits P separated by regions in which the surface of the record medium is undisturbed. The arrow indicates the direction of movement of record medium 1' with respect to the position of spots $R_1'$, $R_2'$, $R_3'$. In order to effect a predetermined track-to-track spacing between adjacent tracks the spot centers which lie on straight line 104 are arranged oblique to the tracks 101, 102, 103. The angle of inclination $\theta$ formed between straight line 104 and track 103 (direction of relative motion) may be varied to vary the track spacing.

In some prior art multiple beam optical record apparatus, the inclination angle $\theta$ is varied by rotating modulator 32 and beam splitter 30. Multichannel modulators for example, of a type which are commercially available from Harris Corporation, have fixed channel spacing requiring the light beams which are incident on the modulator to have a predetermined spacing. The choice of beam splitter (e.g., an optical grating) 30, the spacing between the beam splitter and modulator 32, and the orientation of the elements must be maintained to insure that the beams are incident on the modulator at the correct position. In modulator 32 the input beams may be off axis with respect to the output beams.

Figure 3:
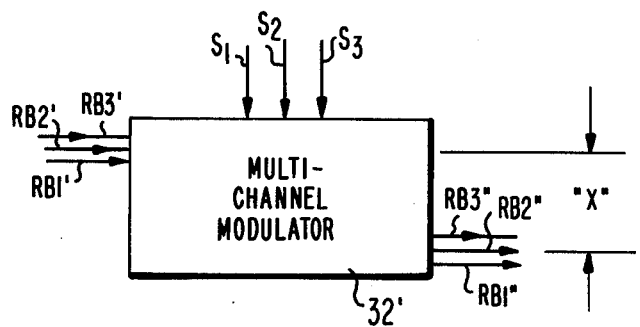
FIG. 3 shows, in more detail, the multi-channel modulator of FIG. 1.
Figure 4:
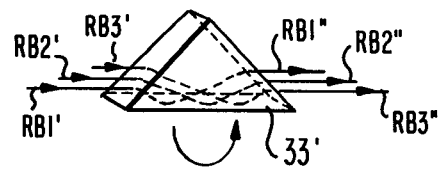
FIG. 4 is a perspective view of the Dove prism of FIG. 1.

Referring to FIG. 3, multi-channel modulator 32' is shown. The three input beams RB1', RB2' and RB3' are not axially aligned with the three output beams RB1", RB2" and RB3". The misalignment of the axes of the input and output beams which is represented by dimension "X" may approach, illustratively, 20 mm. Thus, when modulator 32 is rotated according to the prior art, the axis of the output beams RB1" etc. rotates on a radial arc having radius "X". Rotating the modulator requires a readjustment of most of the optics including beam combiner 42 and beam expander 46.

In accordance with the present invention, the inclination angle $\theta$ may be varied without readjusting other optical elements in the record beam path. Referring to FIG. 4 a Dove prism 33' is shown. As Dove prism 33' is rotated about an axis symmetrical to the beams (in the case shown in FIG. 4 it would be the axis of beam RB2'), the output beams rotate (the beams rotate at twice the angular velocity of the prism). Dove prism 33' should be aligned such that the exit beams are parallel to the input beams and so that the exit beams do not nutate as the prism rotates. The exit beams should rotate about the axis of the prism as prism 33' rotates.

In operation, prism 33' is positioned on rotating fixture 35 (FIG. 1). As rotating fixture 35 is rotated the beams at the surface of the disc rotate to provide an adjustment of the spacing between adjacent tracks on the disc surface.

What is claimed is:
1. A multiple beam optical information recording or retrieval apparatus for use in recording data on or playing back data from a surface of a disc-shaped record medium having a multiple track format, said apparatus comprising:
    means for supporting said record medium;
    means including a light source for providing a plurality of beams of light, each of said plurality of beams having a beam axis, the beam axes of said each of said plurality of beams being substantially aligned in a plane;
    means for directing said plurality of said light beams to said surface of said record medium along a given light path;
    means for focusing said plurality of said light beams to produce spots on said surface of said record medium;
    means for establishing relative motion between said light beam spots and said surface of said record medium such that one of said light beam spots traces a predetermined path on said surface of said record medium;
    said plurality of light beams being aligned such that said light spots are incident on said surface of said record medium and the centers of said spots lie on a straight line; and
    means, positioned in said light path, for varying the angle formed between said predetermined path and said straight line through the center of said spots to adjust the track spacing between adjacent tracks in said multiple track format, said varying means being rotated about a given axis and being coaxial with a symmetrical axis of said plurality of beams.

2. The apparatus according to claim 1 wherein said means for varying comprises a Dove prism.

3. The apparatus according to claim 2 wherein said Dove prism is positioned in said light path such that the symmetrical axis of said plurality of beams which is substantially parallel to the beam axis of said plurality of beams on the input side of said Dove prism is colinear with the symmetrical axis of said plurality of beams on the output side of said Dove prism.

4. The apparatus according to claim 3 wherein said angle formed between said predetermined path and said straight line is varied by rotating said Dove prism about said given axis.

5. A multiple beam optical information recording and retrieval system for use in recording data on and playing back data from a disc-shaped record medium, said system comprising:
- a light source for providing a beam of light;
- a first beam splitter for splitting said beam of light into record and playback light beams, said record light beam defining a first light path and said playback light beam defining a second light path;
- a second beam splitter positioned in said first light path, for splitting said record light beam into a plurality of record light beams;
- means, positioned in said first light path, for modulating each of said plurality of record light beams;
- means for combining said first and second light paths to form a third light path, said third path coupling said combining means and a surface of said record medium;
- means, positioned in said third light path, for focusing each of said light beams to a respective light spot on said surface of said record medium, the light spots of said plurality of record beams impinging on said surface in a straight line which passes through the centers of said spots;
- means for establishing relative motion between said surface of said record medium and one of said plurality of record light spots such that said one of said plurality of record light spots traces a predetermined path across the surface of said record medium; and
- means, positioned in said first light path, for varying the angle formed between said predetermined path and said straight line through the centers of said spots, said varying means being rotated about a given axis, said given axis being coaxial with a symmetrical axis of said plurality of record beams.

6. The system according to claim 5 wherein said means for varying includes a Dove prism.

7. The system according to claim 6 wherein said angle formed between said predetermined path and said straight line is varied by rotating said Dove prism about said given axis.

8. The system according to claim 7 wherein said Dove prism is interposed between said modulating means and said combining means.

9. A multiple beam optical recording and retrieval system for use in recording and retrieving data from a surface of a record medium, said system having a predetermined track-to-track spacing, said system comprising:
- a light source for providing a beam of light;
- first means for splitting said beam of light into record and playback light beams defining first and second light paths respectively;
- second means, positioned in said first light path, for splitting said record beam into a plurality of record beams;
- means for modulating each of said plurality of record beams;
- third means, positioned in said second light path, for splitting said playback light beam into a plurality of playback light beams;
- means for combining said plurality of record beams and said plurality of playback beams such that said combined record and playback beams form a third light path optically coupling said combining means and said surface of said record medium;
- means for focusing each of said light beams in said first and second pluralities to a respective light spot on said surface of said record medium; the light spots formed from said plurality of record light beams being incident on said surface such that the centers of said record light spots lie on a straight line;
- means for establishing relative motion between said light spots and said surface of said record medium such that one of said record light spots traces a predetermined path on said surface of said record medium; and
- means, positioned in said first light path, for varying the track-to-track spacing formed by said record light spots to provide said predetermined track-to-track spacing, said varying means being rotated about a given axis, said given axis being coaxial with a symmetrical axis of said plurality of record beams.

10. The system according to claim 9 wherein said means for varying adjusts said track-to-track spacing by changing the angle formed between said predetermined path and said straight line.

11. The system according to claim 10 wherein said means for varying includes a Dove prism.

12. The system according to claim 11 wherein said Dove prism is interposed between said modulating means and said combining means.

13. In a multibeam optical record or playback system of a type for use in storing information on a surface of a record medium, said system having a predetermined track-to-track spacing, wherein the system includes: a source for providing a beam of light; means for splitting the beam of light into a plurality of beams of light; means for directing said plurality of beams of light to impinge on said surface of said record medium as diffraction limited spots, said spots having centers that lie on a straight line, the improvement which comprises:
- means for varying the track-to-track spacing between adjacent tracks to provide said predetermined track-to-track spacing, said track-to-track spacing being varied by rotating said plurality of beams about an axis symmetrical to said plurality of beams and substantially parallel to the beam axis of one of said plurality of beams.

14. The system according to claim 13 wherein said means for varying comprises a Dove prism, positioned in the path of said plurality of beams, for rotating said plurality of beams.

* * * * *